A. A. KLUG.
TRUSS.
APPLICATION FILED NOV. 13, 1908.
943,685.  Patented Dec. 21, 1909.
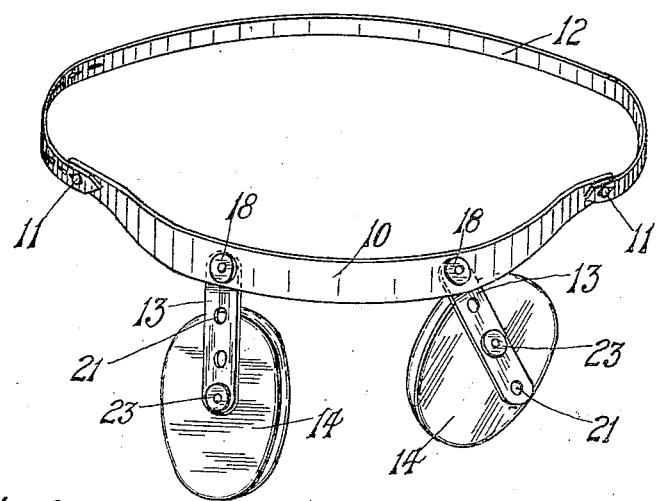
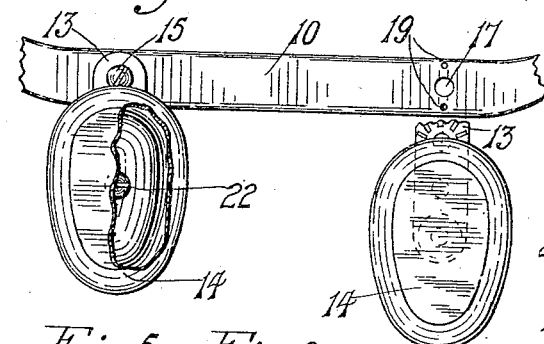
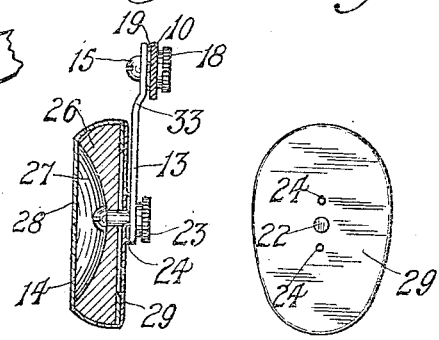
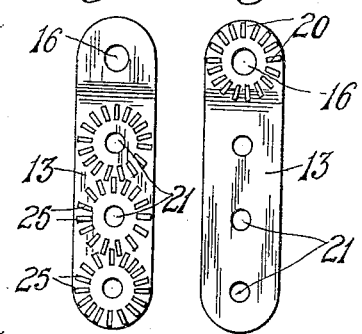
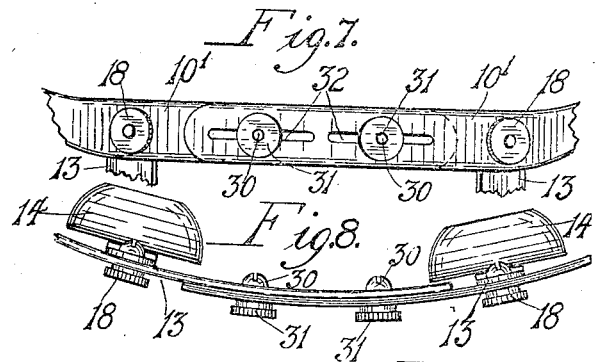
Witnesses.
A. Y. Andrews.
Anna F. Schmidtbauer.
Inventor.
Albert A. Klug
By Benedict, Morsell & Caldwell
Attorneys.

UNITED STATES PATENT OFFICE.

ALBERT A. KLUG, OF MERRILL, WISCONSIN.

TRUSS.

943,685.  Specification of Letters Patent.  Patented Dec. 21, 1909.

Application filed November 13, 1908. Serial No. 462,369.

*To all whom it may concern:*

Be it known that I, ALBERT A. KLUG, residing in Merrill, in the county of Lincoln and State of Wisconsin, have invented new and useful Improvements in Trussses, of which the following is a description, reference being had to the accompanying drawings, which are a part of this specification.

This invention has for its object to provide a truss of such a construction that the pads may be adjusted to any position on the wearer and will retain their adjusted position and exert more or less pressure as desired.

With the above and other objects in view the invention consists in the truss herein shown and described, its parts and combinations of parts and all equivalents.

Referring to the accompanying drawings in which like characters of reference indicate the same parts in the different views; Figure 1 is a perspective view showing the truss of this invention with the pads in different adjustments; Fig. 2 is a detail view thereof with the covering of one of the pads broken away to show the cavity in the body portion thereof and the arm of the other pad broken away to show the locking means therefor; Fig. 3 is a sectional view of one of the pads; Fig. 4 is a detail view thereof disconnected from its arm member; Fig. 5 is a detail view showing one side of the arm member; Fig. 6 is a similar view showing the other side of the arm member; Fig. 7 is a front view of a modified form of the belt member; and Fig. 8 is a plan view thereof.

In these drawings 10 indicates a belt member which is preferably formed of a strip of spring sheet metal which while being sufficiently resilient to exert a strong spring pressure may also be forced to change its shape when sufficient pressure is exerted thereon whereby its curvature may be made to suit varying requirements. The ends of the belt member 10 are curved upwardly and then slightly downwardly so as to fit the hips of the wearer and at its extremities it is provided with headed pins 11 for adjustable connection with a strap 12 which completes the belt formation.

At the comparatively straight front portion of the belt member 10 a pair of arms 13 are pivotally connected thereto at a distance apart and each arm has adjustably mounted on it a truss pad 14. The pivotal connection between the belt member 10 and the arms 13 comprises a bolt 15 passing through an opening 16 in the end of the arm 13 and through an opening 17 in the belt member 10 with a thumb nut 18 threaded on its end, there being a pair of opposite lugs 19 formed on the belt member 10 to enter into notches 20 on the end of the arm 13 to lock the arm rigidly in place against turning on the bolt when the thumb nut 18 is tightened. The notches 20 are arranged in a circular formation and around the openings 16 of the arms 13 so that they will be engaged by the lugs 19 in any angular position to which the arms may be turned, and thus lock the arms in their angular adjustments when the nuts are tightened.

The connection between the arms 13 and the pads 14 are similarly formed, there being a series of openings 21 in the arms 13 at different distances from their openings 16 in any one of which the bolt 22 which is embedded in the pad member and projects therefrom may be entered and have a thumb nut 23 turned on it to clamp it in place, there being a pair of opposite lugs 24 on the pad member to enter notches 25 on the arm member to lock the pad in place. The notches 25 are arranged around the openings 21 in the same manner that the notches 20 are arranged around the openings 16 so that the pad may not only be adjusted nearer to or farther from the belt member by entering its bolt in one or another of the openings 21, but it may be locked in any angular position with relation to the arm by having its lugs 24 fit within different notches 25.

The pad member preferably comprises an oval shaped block 26 of wood or other suitable material provided with a recess or cavity 27 at its bearing face with a covering 28 of chamois skin or like soft material which is stretched over the recess and is secured to the back of the block where a sheet metal plate 29 is mounted to cover the edges of the covering and in which the lugs 24 are formed, said cover plate being fastened to the block in any desired manner.

In the modification of the invention shown in Figs. 7 and 8 a further adjustment is provided in addition to those above mentioned by forming the belt member 10 in two pieces with their ends overlapped and clamped together by bolts 30 with thumb nuts 31 threaded thereon, which bolts fit through registering elongated slots 32 in these overlapping portions. By means of this adjustment the distance between the pad arms 13 may be varied at will to bring the truss pads nearer together or farther apart.

In operation, the belt member 10 may be bent to the desired formation to fit the waist of the wearer where it will retain its shape with a strong spring action. The pads 14 may be adjusted to apply pressure wherever desired by the angular adjustment of the arms 13 on the belt member and the angular as well as the distance adjustment of the pads on the arm members, the degree of the pressure exerted by each pad being within control by bending the arms 13 toward or away from the wearer as shown at 33 in Fig. 3. With the modified form of the invention the pads may also be brought nearer together or farther apart without changing the angle of the connecting arms 13 with relation to the belt member 10 by adjusting the sections of the belt member nearer together or farther apart. The formation of the pad is such that an air cushion is produced thereby which will be easy and comfortable to the wearer.

What I claim as my invention is:

1. A truss, comprising a belt member of stiff spring metal with ends forming compound curves to fit the hips of the wearer, means for securing the belt member to the waist of the wearer, a pair of arms pivotally mounted on the belt member at a distance apart and having engaging lugs and notches to lock the arms in angular adjustment with relation to the belt member, said arms being provided with a number of openings at different distances from their pivotal connections, and pads pivotally mounted in said openings and having engaging lugs and notches between them and the arms to lock them in their angular adjustments on the arms, the pivotal connections between the arms and the belt member and between the pads and the arms comprising bolts with thumb nuts for clamping the parts together, and said arms being adapted to be bent to adjust the position of the pads toward or away from the wearer.

2. A truss, comprising a belt member formed in sections overlapping each other and adjustably connected together, a strap connecting the ends of the belt member for securing it to the waist of the wearer, arms pivotally mounted on the sections of the belt member with engaging lugs and notches for locking them in their angular adjustments with relation to the belt member, there being a series of openings in the arms at different distances from their pivotal connections, and pads pivotally mounted in said openings of the arms with engaging lugs and notches for locking them in their angular adjustments on the arms, said pads comprising blocks having recesses or cavities in their faces, yielding coverings stretched over the cavities of the blocks and secured to the opposite sides of the blocks, metal plates secured to the blocks over the edges of the covering, said connections between the sections of the belt member comprising bolts fitting in slots of the said sections and having nuts threaded therein, and said connections between the arms and the belt member and between the pads and the arms comprising bolts with thumb nuts threaded thereon to clamp the parts together and to secure the engagement of the lugs and notches.

In testimony whereof, I affix my signature, in presence of two witnesses.

ALBERT A. KLUG.

Witnesses:
 HARRY R. ALLEN,
 HENRY J. KLUG.